Oct. 22, 1963   A. R. GETZIN   3,107,990
UNIT FILTER ASSEMBLY
Filed April 28, 1960   3 Sheets-Sheet 1
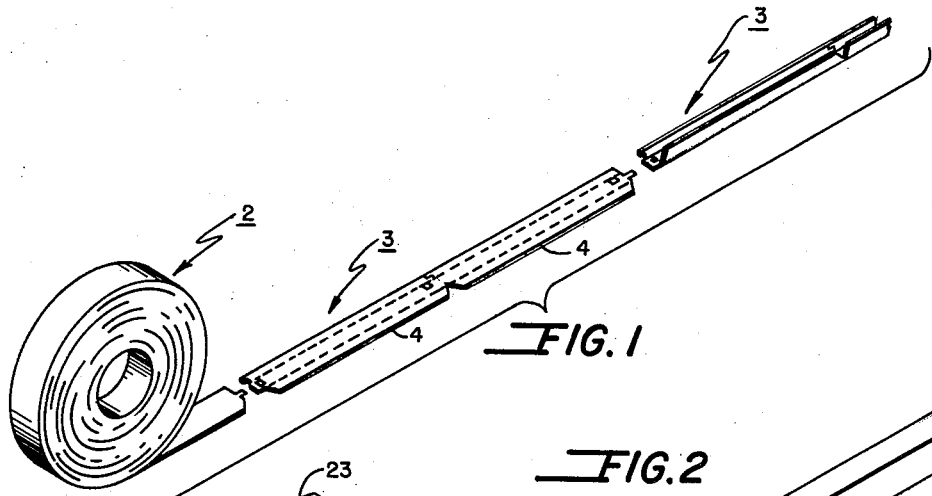
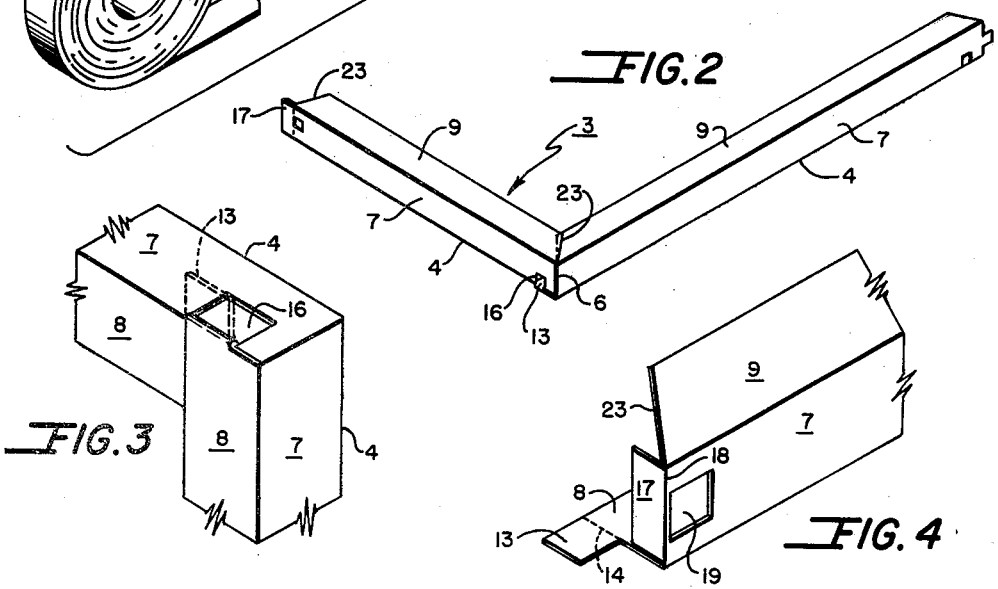
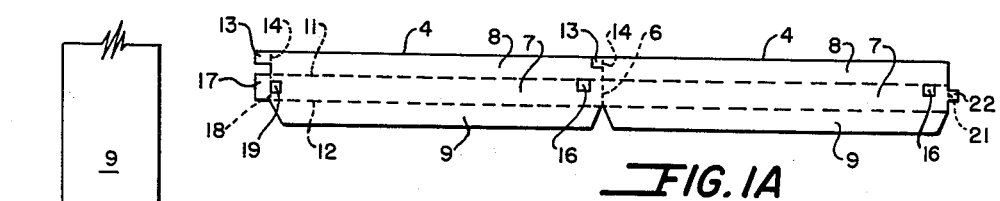
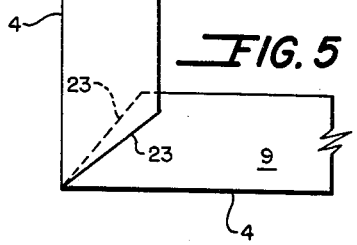
INVENTOR.
ALLAN R. GETZIN
BY
Ralph B. Brick
ATTORNEY Oct. 22, 1963 A. R. GETZIN 3,107,990
UNIT FILTER ASSEMBLY
Filed April 28, 1960 3 Sheets-Sheet 2
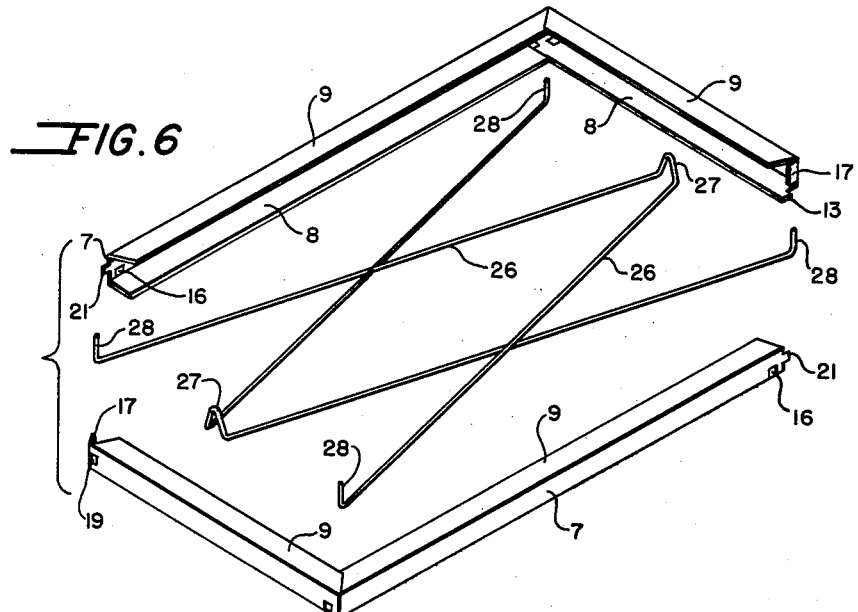
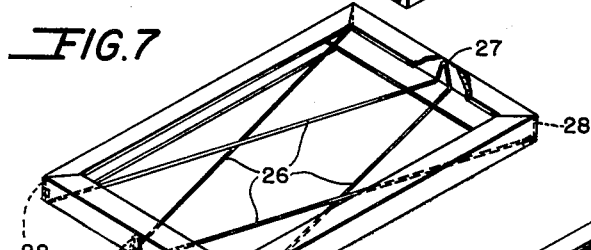
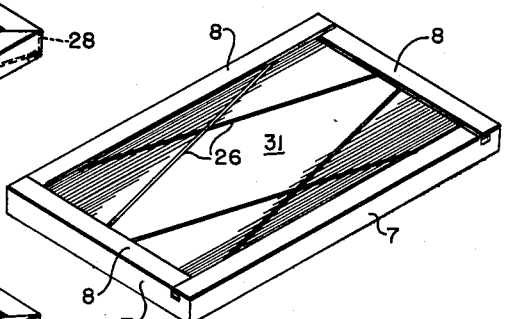
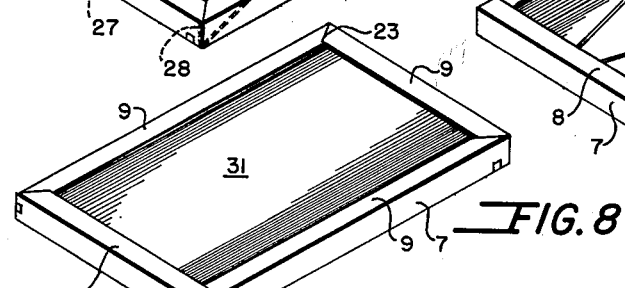
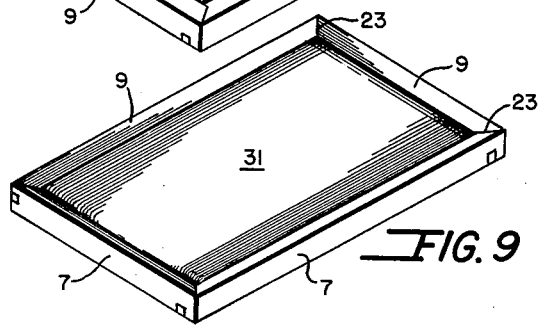
INVENTOR.
ALLAN R. GETZIN
BY
Ralph B. Brick
ATTORNEY Oct. 22, 1963 A. R. GETZIN 3,107,990
UNIT FILTER ASSEMBLY
Filed April 28, 1960 3 Sheets-Sheet 3

*INVENTOR.*
ALLAN R. GETZIN
BY
Ralph B. Brick
ATTORNEY

United States Patent Office 3,107,990
Patented Oct. 22, 1963

3,107,990
UNIT FILTER ASSEMBLY
Allan R. Getzin, Jeffersontown, Ky., assignor to American Air Filter Company, Inc., Louisville, Ky., a corporation of Delaware
Filed Apr. 28, 1960, Ser. No. 25,412
11 Claims. (Cl. 55—491)

The present invention relates to a fluid filter and more particularly to a unit filter assembly including an open-ended frame member and a filter medium disposed therein.

In accordance with the present invention an improved unit filter assembly arrangement is provided which permits rapid and economic mass manufacture and construction of unit filter assemblies over a broad range of sizes, the resulting filter assemblies being adaptable for various types of filter media. In addition the present invention provides a unit filter assembly which affords excellent dimensional and torsional stability with a minimum use of materials and which provides for a firmly supported filter medium.

Various other features of the present invention will become obvious to one skilled in the art upon reading the disclosure set forth hereinafter.

More particularly the present invention provides a unit filter assembly which includes a multi-sided, open-ended frame member and a filter medium supported thereby, the sides of the frame member each having a web portion and a flange portion with a connection at at least one of the corners formed by adjacent sides of the frame member including a tab member extending from an extremity of a flange portion of one of the adjacent sides engaging with the web portion of the other adjacent side. In addition, the present invention provides a novel manner of gripping the peripheral portions of the medium disposed in the frame and a novel manner of supporting the medium across a face of the open-ended frame member.

It is to be understood that various changes can be made by one skilled in the art in the arrangement, form and construction of the apparatus herein disclosed without departing from the scope or spirit of the present invention.

Referring to the drawings which disclose an advantageous embodiment of the present invention and modification thereto:

FIGURE 1 is an exploded isometric view of the inventive filter frame blank sections and the coil stock from which they are produced;

FIGURE 1A is an enlarged view of one of the filter frame blank sections of FIGURE 1;

FIGURE 2 is an enlarged isometric view of a filter frame blank section of FIGURE 1 in set-up position;

FIGURE 3 is a further enlarged isometric view of a corner formed by the set-up filter frame blank section of FIGURE 2;

FIGURE 4 is an enlarged isometric end view of the set-up filter frame blank section of FIGURE 2;

FIGURE 5 is an enlarged plan view of a face of a filter frame corner opposite the face disclosed in FIGURE 3;

FIGURE 6 is an exploded isometric view of a pair of set-up filter frame blank sections and V-shaped grid members associated therewith;

FIGURE 7 is a slightly reduced isometric view of the filter frame structure of FIGURE 6 in assembled position without filter medium;

FIGURE 8 is an isometric view of the filter frame structure of FIGURE 7 with filter medium supported in the filter frame member;

FIGURE 9 is an isometric view similar to that of FIGURE 8 with the flange portions having mitered extremities in downwardly turned position to grip the filter medium;

FIGURE 10 is an isometric view of the filter assembly of FIGURES 8 and 9 disclosing the opposing side thereof with the V-shaped grid supports in engagement with the filter medium;

Figure 12:
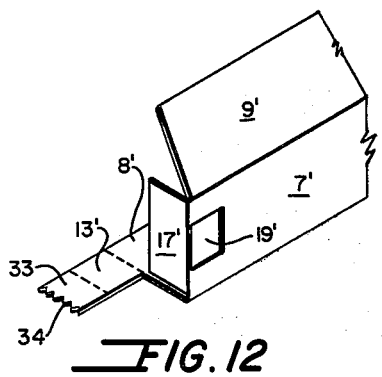
FIGURE 12 is an enlarged isometric end view of a set-up filter frame blank similar to that of FIGURE 4 but further disclosing a modified tab member; and, FIGURE 13 is a cross-sectional view of a corner of a filter frame assembly which incorporates the modified tab member arrangement of FIGURE 12.

Referring to FIGURE 1 of the drawings, a coil stock 2 is disclosed from which the filter frame blank sections 3 are produced. The coil stock can be stamped or roll pressed from any one of a number of suitable metals or plastic materials and, advantageously, it can be an aluminum strip of .016 gauge.

As disclosed in FIGURE 1, the coil stock is formed into identical sections 3, each consisting of pairs of end-to-end connected side members 4, the sections being so scored that they can be readily set-up and connected to form an open-end frame member (as will be seen hereinafter). It is to be understood that the present invention is not limited to the particular embodiment disclosed in FIGURE 1. If desired, a continuous strip of sections of more than two side members can be provided to form open-ended frame members of a various number of sides.

As can be seen more particularly in FIGURE 1A, the end-to-end side members 4 are divided from each other by transverse score lines 6. Each side member 4 includes a web portion 7 and a pair of flange portions 8 and 9 which are divided from the web portion 7 by a pair of parallel spaced score lines 11 and 12 respectively which run transverse to score lines 6. Each flange portion 8 has integral therewith at one corresponding extremity thereof a tab member 13. This tab member 13, which is divided from flange portion 8 by score line 14, is adapted to cooperate with an aperture 16 provided at one corresponding extremity of each of web portions 7.

In order to provide for proper connection of the web portions 7 of each of the sections 3, one extremity of section 3 has extending from a web portion 7 a connecting end panel 17, which is divided from the web portion by score line 18. Positioned adjacent end panel 17 in web portion 7 along score line 18 is an aperture 19 and extending from web portion 7 at the extremity of section 3 opposite connecting end panel 17 is tab member 21. Tab member 21 is divided from the web portion by a score line 22 and as will be seen hereinafter, in setting up the filter frame, a tab member 21 of one frame section 3 is adapted to engage in an aperture 19 of another frame section.

Each of flange portions 9 of section 3 has its extremities, as indicated by reference numeral 23, mitered at preselected angles (FIGURE 5). As will be seen hereinafter, the preselected mitered angles permit a preselected overlapping of adjacent extremities of adjacent flange portions 9 when the side members 4 are set up so that such flange portions 9 are at substantially right angles to their web portions 7. When these flange portions 9 are subsequently turned downwardly and inwardly a preselected amount to grip the filter medium disposed in the frame assembly, edge-to-edge mating of adjacent extremities 23 is obtained.

In setting up the filter assembly, flange portions 8 and 9 of each section 3 are turned inwardly toward each other at substantially right angles to their respective web portions 7, thus forming partially set up sides 4 of channel-shaped cross section (FIGURES 1 and 2). The partially set up sides 4 are then turned at right angles one with respect to the other about transverse score line 6 to form section 3 into an L shape. In this connection it is to be noted that tab member 13 of flange portion 8 of one side member 4 engages in aperture 16 in the web portion 7 of an adjacent side member. As a result of this particularly novel corner connection, the final frame assembly is provided with added dimensional and torsional stability. In this connection, it is to be noted that tab 13 of flange portion 8 of one side member 4 grips flange portion 8 of an adjacent side member 4 in the event separating forces are applied to such adjacent side members. In the event opposite forces are applied to such adjacent side members, the extremity of flange portion 8 without a tab member of one side member abuts against the web portion 7 of the adjacent side member.

Figure 11:
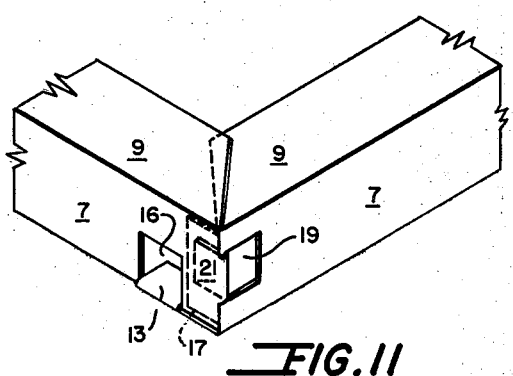
FIGURE 11 is an enlarged exploded isometric view of a corner of the filter frame of FIGURE 7, further disclosing the connection of a pair of set-up filter frame sections.

Once a pair of sections 3 are properly set up in L shape form, as in FIGURE 2, they can be connected together to form a rectangular open-ended frame member (FIGURE 6). To accomplish this, the connecting end panels 17 of each section 3 are turned at right angles to their adjacent web portions 7 so that each abuts against the web portion 7 of a side member of the other section 3. The tab members 21 of each section are then turned into interlocking engagement with apertures 19 of the other section (FIGURE 11). Further, in a manner similar to that abovedescribed for the corner connection about score lines 6, the still unconnected tab members 13 in the flange portion 8 of each section are turned into interlocking engagement with apertures 16 of the web portions 7 adjacent the tab members 21, to thus provide the aforementioned dimensional and torsional stability (FIGURES 6, 7 and 11). It is to be noted that, if desired, connecting end panels 17 can be fastened to the web portions 7 against which they abut by some suitable stapling or welding means to further enhance the stability of the filter assembly.

As can be seen in FIGURE 6 of the drawings, the filter assembly includes a pair of superposed V-shaped grid members 26 extending in cross relationship with respect to each other across the face of the open-end frame member. Each grid member has at its apex a portion 27 turned at a substantially right angle to the grid body and sized to correspond with the breadth of web portion 7 against which it abuts. In like manner, each of the extremities of the legs of the grid member 26 have portions turned at substantially right angles to the grid body, as at 28, these leg portions 28 being sized like apex portions 27. As can be seen in FIGURE 7 of the drawings, the superposed grid members 26 are sized in accordance with the frame assembly so that the leg portions 28 nest in the corners of the frame member and the apex portions 27 engage against web portions 7 of the frame member. It is to be understood that grid members 26 can be of resilient material and can be sized in a modified manner with the apex and leg extremity portions yieldably engaging against the web portions of the frame member at positions other than the corners thereof.

As can be seen in FIGURES 5, 7, 8, 9 and 11 of the drawings and as abovedescribed, the extremities of flange portions 9 are mitered as at 23 at a predetermined angle which causes them to overlap when the flange portions 9 are at substantially right angles to web portions 7 of the frame. With the frame member set up as in FIGURE 7, a suitably sized piece of rectangular filter medium 31, such as polyurethane or expanded aluminum mesh, can be assembled in the frame member so that the peripheral edges of the medium engage between flange portions 8 and 9 and one face of the medium rests against crossed grid members 26. Flange portions 9 are then pressed downwardly and inwardly to grip the medium 31 and firmly support the same. It is to be noted (FIGURE 9) that flange portions 9 are bent inwardly at a predetermined angle so that the mitered extremities 23 thereof engage in edge-to-edge contact to provide a neat and uniform filter assembly which has dimensional and torsional stability. It is to be understood in this connection that, if desired, flange portions 9 need not be first bent at right angles to web portions 7 to form sections of channel shape cross-section but, rather, can be maintained as is in blank form until the filter medium 31 has been inserted.

Figure 13:
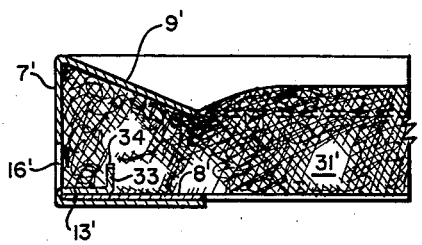

Referring to FIGURES 12 and 13 of the drawings, a modified corner connection is disclosed. In this modification, a set up filter frame blank is disclosed to be like that of FIGURE 4 so as to include a web portion 7', flange portions 8' and 9', aperture 19', connecting panel 17' and tab 13'. Tab 13', however, further includes a tab extension member 33, extending from tab member 13' and having serrated edge 34. Accordingly, when the frame assembly is set up, tab extension member 33 is turned at right angles to tab 13' to insure a further positive grip of the medium 31' between flange 9' and tab extension member 33 (FIGURE 13).

The invention claimed is:

1. A unit filter assembly comprising an open-ended frame member and a filter medium disposed therein, said frame member having a plurality of sides, each side including a web portion and a flange portion disposed at substantially a right angle to said web portion, said sides being connected together to form a multi-cornered supporting frame along the periphery of said filter medium with a connection at at least one of the corners formed by two adjacent sides of said frame member including a tab member extending from an extremity of the flange portion of one of said adjacent sides and an aperture provided in the web portion of the other of said adjacent sides, the periphery of said aperture defining an area opening conforming at least to the area defined by said tab member to permit said tab member to be pivoted about its flange portion through said aperture into facing relationship with the flange portion of the other side and within the frame sides.

2. A unit filter assembly comprising an open-ended frame member and a filter medium disposed therein, said frame member having a plurality of sides, each side including a web portion and a flange portion disposed at substantially a right angle to said web portion, said sides being connected together to form a multi-cornered supporting frame along the periphery of said filter medium with a connection at at least one of the corners formed by two adjacent sides of said frame member including a tab member extending from an extremity of the flange portion of one of said adjacent sides and an aperture provided in the web portion of the other of said adjacent sides, the periphery of said aperture defining an area opening conforming at least to the area defined by said tab member to permit said tab member to be pivoted about its flange portion through said aperture into facing relationship with the flange portion of the other side and within the frame sides, said tab member having its end portion turned inwardly to engagingly grip the filter medium disposed in said frame member along one face thereof.

3. The apparatus of claim 2, and means on said adjacent side including said tab member positioned to engagingly grip along the other face of said filter so as to co-operate with said tab member to clamp such filter medium therebetween.

4. A filter frame blank which when assembled serves to hold a fluid filter medium comprising a plurality of end-to-end connected side members, said side members being divided from each other by a first set of transverse score lines, each of said side members including a web portion and at least one flange portion divided from said web portion by one of a further set of score lines transverse to said first set of score lines, each of said flange portions having integral therewith at one corresponding extremity thereof a tab member and each of said web portions having an aperture at one corresponding extremity thereof to receive the tab member of the flange portion of an adjacent side member, the periphery of said aperture defining an area opening conforming at least to the area defined by said tab member to permit said tab member to be pivoted about its flange portion through said aperture into facing relationship with the flange portion of the other side and within the frame sides, and means to connect one of the ends of said end-to-end side members to the end of another side member in setting up said filter frame assembly.

5. A filter frame blank which when assembled serves to hold a fluid filter medium comprising a plurality of integral end-to-end connected side members, said side members being divided from each other by a first set of transverse score lines, each of said side members including a web portion and a pair of opposed flange portions divided from said web portion by a pair of parallel spaced score lines of two further sets of score lines extending transverse to said first set of score lines, one corresponding flange portion of each pair of flange portions having integral therewith at one corresponding extremity thereof a tab member, and each of said web portions having an aperture at one corresponding extremity thereof positioned to receive the tab member of the flange portion of an adjacent side member, the periphery of said aperture defining an area opening conforming at least to the area defined by said tab member to permit said tab member to be pivoted about its flange portion through said aperture into facing relationship with the flange portion of the other side and within the frame sides, the other corresponding flange portion of each pair having its opposite extremities mitered at preselected angles to permit a preselected overlapping of adjacent extremities of such adjacent flange portions when said side members are set up with such flange portions at substantially right angles to their web portions to permit edge-to-edge mating of such adjacent extremities at a preselected point when said flange portions are turned inwardly a preselected degree so as to grip filter medium disposed in the frame blank, and means to connect one of the ends of said end-to-end side members to the end of another side member in setting up said filter frame assembly.

6. A unit filter assembly comprising a rectangular open-ended frame member and a filter medium disposed therein, each of the sides of said frame member including a web portion and a flange portion disposed at substantially right angles to said web portion, said sides being connected together to form the supporting frame along the periphery of said filter medium with each of the corners formed by adjacent sides of said frame member including a tab member extending from an extremity of a flange portion of one of said adjacent sides and an aperture provided in the web portion of the other of said adjacent sides, the periphery of said aperture defining an area opening conforming at least to the area defined by said tab member to permit said tab member to be pivoted about its flange portion through said aperture into facing relationship with the flange portion of the other side and within the frame sides.

7. A unit filter assembly comprising a rectangular open-ended frame member and a filter medium disposed therein, each of the sides of said frame member being of channel-shaped cross-section to include a web portion and depending flange portion, one corresponding flange portion of each side being disposed at substantially right angles to said web portion and the other corresponding flange portion being turned downwardly at an angle toward the first angle portion to grip the peripheral edge of said filter medium therebetween, said sides being connected together to form the supporting frame along the periphery of said filter medium with each of the corners formed by adjacent sides of said frame member including a tab member extending from an extremity of a depending flange portion disposed at substantially right angles to said web portion of one of said adjacent sides, and an apperture provided in the web portion of the other of said adjacent sides, the periphery of said aperture defining an area opening conforming at least to the area defined by said tab member to permit said tab member to be pivoted about its flange portion through said apperture into facing relationship with the flange portion of the other side and within the frame side, the extremities of the downwardly turned flange portion being mitered at a preselected angle to permit edge-to-edge contact of adjacent flange extremities when said flange portions are at a preselected downwardly turned position.

8. The unit filter assembly of claim 7, said assembly including a pair of superposed, V-shaped grid members extending in cross relationship with respect to each other across a face of said open-ended frame member, each of said grid members being formed from a continuous strip of material and each having portions at its apex and leg extremities turned at substantially right angles to the body of the grid members, with each of said grid members being sized so that the leg extremity portions nest in one pair of corners of said frame member and the portion at the apex engages against a web portion of said frame member intermediate a pair of opposite corners of said frame member, said leg extremity and apex portions each having a size corresponding to the breadth of the web portion against which it engages to prevent shifting of said grid member.

9. In a unit filter assembly including a filter medium disposed in an open-ended multi-cornered frame member having sides of channel shaped across section so as to each include a web portion and depending flange portions, a V-shaped filter medium supporting grid member formed from a continuous strip of material and having portions at its apex and leg extremities turned at substantially right angles to the body of said grid member, said grid member being sized so that the apex and leg extremity portions engage in firm relationship against the web portions of said frame member, said leg extremity and apex portions each having a size corresponding to the breadth of the web portion against which it engages to prevent shifting of said grid member.

10. The apparatus of claim 9, said grid members being of resilient material to provide yieldable engagement against said web portions.

11. A filter frame blank which when assembled serves to hold a fluid filter medium comprising a plurality of integral end-to-end connected side members, said side members being divided from each other by a first set of transverse score lines, each of said side members including a web portion and a pair of opposed flange portions divided from said web portion by a pair of parallel spaced score lines of two further sets of score lines extending transverse to said first set of score lines, one corresponding flange portion of each pair of flange portions having integral therewith at one corresponding extremity thereof a tab member, and each of said web portions having an aperture at one corresponding extremity thereof positioned to receive the tab member of the flange portion of an adjacent side member, the other corresponding flange portion of each pair having its opposite extremities mitered at preselected angles to permit a preselected overlapping of adjacent extremities of such adjacent flange portions when said side members are set up with such flange portions at substantially right angles to their web portions and to permit edge-to-edge mating of such adjacent extremities at a preselected point when said flange portions are turned inwardly a preselected degree so as to grip filter medium disposed in the frame blank, and means to connect one of the ends of said end-to-end side members to the end of another side member in setting up said filter frame assembly, said means to connect one of the ends of said endto-end side members to the end of another side member including a connecting panel portion extending from one of the ends of a web portion of the first of said end-to-end side members, said connecting panel portion being divided from said web portion from which it extends by a transverse score line parallel to said first set of transverse score lines, an aperture in said web portion from which said connecting panel portion extends, and a tab member extending from the extremity of the web portion of the second end-to-end side member, said tab member being adapted to interlockingly engage in the aperture in said web portion of said other side member.

References Cited in the file of this patent

UNITED STATES PATENTS

| | | |
|---|---|---|
| 2,001,681 | Huff | May 14, 1935 |
| 2,405,293 | Dahlman | Aug. 6, 1946 |
| 2,405,716 | Schaaf | Aug. 13, 1946 |
| 2,421,743 | Cartter et al. | June 10, 1947 |
| 2,513,946 | Kliefoth | July 4, 1950 |
| 2,675,887 | Gonzalez | Apr. 20, 1954 |
| 2,723,731 | Schaaf | Nov. 15, 1955 |
| 2,754,928 | Hambrecht et al. | July 17, 1956 |
| 3,031,047 | Williams | Apr. 24, 1962 |